US006925395B2

(12) United States Patent
Kadner

(10) Patent No.: US 6,925,395 B2
(45) Date of Patent: Aug. 2, 2005

(54) APPARATUS AND METHOD FOR MEASURING THE TORQUE APPLIED TO BOLTS

(75) Inventor: Steven P. Kadner, Albuquerque, NM (US)

(73) Assignee: Canberra Aquila, Inc., Albuquerque, NM (US)

(*) Notice: Subject to any disclaimer, the term of this patent is extended or adjusted under 35 U.S.C. 154(b) by 0 days.

(21) Appl. No.: 10/270,747

(22) Filed: Oct. 15, 2002

(65) Prior Publication Data

US 2004/0073384 A1 Apr. 15, 2004

(51) Int. Cl.[7] .................................................. G01L 1/00

(52) U.S. Cl. .......................................................... 702/41

(58) Field of Search .................. 702/41, 141; 439/157; 156/181; 361/775; 73/862, 818; 310/329; 173/177; 123/177, 56; 81/469; 470/111; 166/301; 356/501, 501.3; 340/573

(56) References Cited

U.S. PATENT DOCUMENTS 5,503,028 A * 4/1996 Brihier .................... 73/862.21

6,009,948 A * 1/2000 Flanders et al. ............ 166/301

2003/0160967 A1 * 8/2003 Houston et al. ............ 356/501

* cited by examiner

*Primary Examiner*—John Barlow

*Assistant Examiner*—Tung S Lau

(74) *Attorney, Agent, or Firm*—David W. Carstens; Carstens & Cahoon, LLP

(57) ABSTRACT

An apparatus and method for measuring and recording the torque applied to a bolt. The present invention utilizes a piezoelectric compound disposed between an upper member and a lower member. When the bolt is tightened, the piezoelectric compound is physically distorted and a net electrical potential is created across the piezoelectric compound. A processor in the bolt measures the electrical potential and calculates the torque based on the potential. The bolt then transmits a data packet comprising the torque value and bolt information to a wrench, which later transmits the data packet to a computer and a database. Alternatively, the bolt can be configured with a transmitter so that the data packet can be transmitted directly from the bolt to the computer and database. The bolt can also be configured with energizing circuitry that acts as a power source for the bolt.

26 Claims, 4 Drawing Sheets

APPARATUS AND METHOD FOR MEASURING THE TORQUE APPLIED TO BOLTS

BACKGROUND OF THE INVENTION

1. Technical Field

The present invention relates to an apparatus and method of measuring and recording the amount of torque applied to a specific bolt.

2. Description of Related Art

Apparatuses and methods of measuring the amount of torque applied to a bolt are well known in the art. FIG. 1 is an example of a typical torque wrench that measures the amount of torque applied to a bolt. However, tools like the torque wrench illustrated in FIG. 1 are not always precise in the exact measurement of torque applied the bolt. Moreover, these types of torque wrenches are not able to record the amount of torque applied to an individual bolt.

In the many industries, a heightened standard exists for all facets of construction, assembly, and maintenance. This is especially true in the aircraft industry. In aircraft construction, assembly, and maintenance, it is desirable to measure and catalog the amount of torque applied to every single bolt in the aircraft. These torque values can then be reported to the Federal Aviation Administration and the owner of the aircraft. Current methods of measuring and recording the torque values involve measuring the torque with a torque wrench, like the one illustrated in FIG. 1, and recording the torque value in a database. Unfortunately, this method presents a large opportunity for erroneous measurement and recordation when a multiplicity of bolts are involved.

Piezoelectric compounds are also well known in the art. FIG. 2A is an illustration of a piezoelectric crystal, such as quartz. Piezoelectric compounds physically deform when exposed to an electrical signal or field. Conversely, piezoelectric compounds also polarize and generate an electrical potential when an external force is applied to them. FIG. 2B is an illustration of the polarization of an individual piezoelectric crystal under an external pressure. The polarization of a plurality of crystals generates a net electrical potential across the entire piezoelectric compound. In fact, piezoelectric compounds exhibit this phenomenon so predictably and precisely that piezoelectric compounds can be used for very accurate pressure measurements. Piezoelectric compounds are preferable to other types of pressure measurement devices because they do not distort or otherwise deteriorate when repeatedly expanded and contracted. Because torque and pressure are directly related in a threaded apparatus like a bolt, the resulting electrical potential of a piezoelectric compound can be used to precisely measure the applied torque.

Consequently, a need exists for an apparatus and method for measuring and recording the torque applied to a bolt without the need to physically record the measurement from a torque wrench. Furthermore, a need exists for an apparatus and method that measures the torque applied to a bolt using a piezoelectric compound. Moreover, a need exists for an apparatus and method for recording the amount of torque applied to a specific bolt.

SUMMARY OF THE INVENTION

The present invention, which meets the needs identified above, comprises a bolt that measures the torque applied to it. The bolt comprises an upper member and a lower member that surround a piezoelectric layer. When the bolt is rotated, the upper member is pulled toward the threaded receptacle and the lower member is held in place by a surface. The piezoelectric compound between the upper member and the lower member is physically distorted, producing a net electrical potential across the compound.

The bolt also comprises a processor that measures the net potential across the piezoelectric compound and uses that value to calculate the torque applied to the bolt. The processor is coupled to a memory that stores information regarding the bolt. When a wrench is used to tighten the bolt, an external connection on the bolt mates up with a similar connection on the socket. The processor in the bolt then transmits a data packet comprising the torque value and the bolt information to the wrench. The wrench can then be stored in a housing that is electrically coupled to a computer and a database. The housing collects the data packets from the wrench and transmits the data packets to the computer and database.

Alternatively, the bolt can comprise an RF transmitter. The RF transmitter transmits the data packet either to the wrench or directly to the computer and database. Further in the alternative, the bolt can comprise circuitry that is energized by a signal transmitted at a specific frequency. The energized circuitry allows the bolt to transmit the data packet to an external receiver without the need for a power source.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
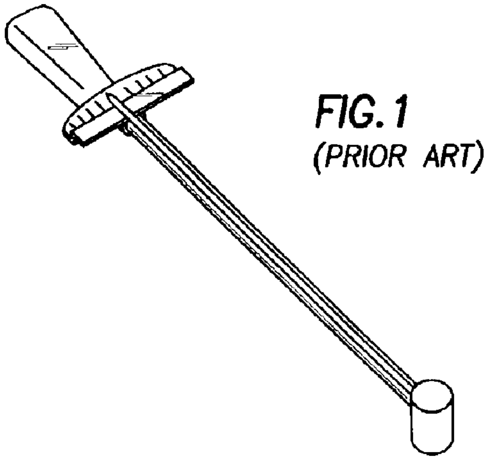
FIG. 1 (PRIOR ART)
FIG. 1 is a perspective illustration of a torque wrench.
Figure 2A:
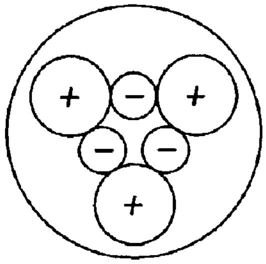
FIG. 2A (PRIOR ART)
FIG. 2A is a cross-section in elevation of a piezoelectric crystal.
Figure 2B:
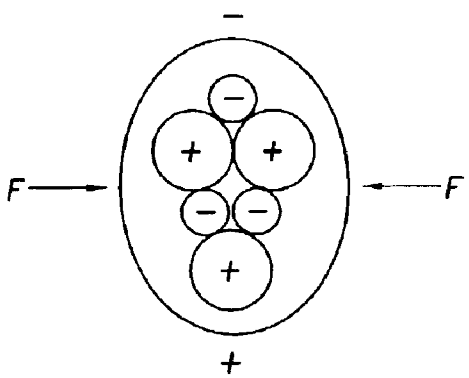
FIG. 2B (PRIOR ART)
FIG. 2B is a cross-section in elevation of a physically distorted piezoelectric crystal.
Figure 3:
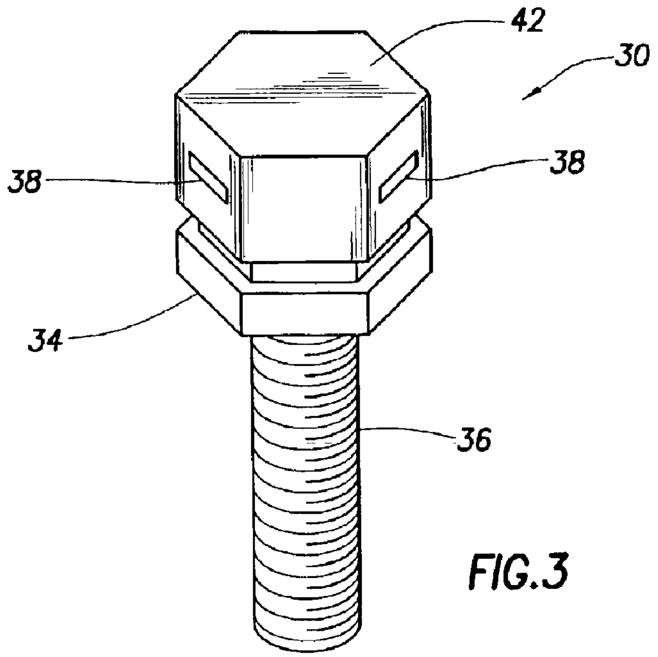
FIG. 3 is a perspective view of the bolt of the present invention.

FIG. 3 is a perspective view of the bolt 30 of the present invention. Identical reference numerals will be used to identify identical elements throughout all of the drawings, unless otherwise indicated. The bolt 30 comprises an upper member 42, a lower member 34, a threaded shank 36, and three external electrical connections 38. The upper member 42 and the lower member 34 are hexagonally shaped and sized according to standardized metric or SAE bolt sizes. Alternatively, the bolt 30 can be square, rectangular, pentagonal, octagonal, shaped to accept an allen or torx wrench, or any other shape as determined by persons skilled in the art. The electrical connections 38 are located on three non-adjacent sides of the hexagonal bolt 30. The electrical connections 38 are linked together so that the internal components of the bolt 30 may communicate with external devices through any one of the three electrical connections 38.

Figure 4:
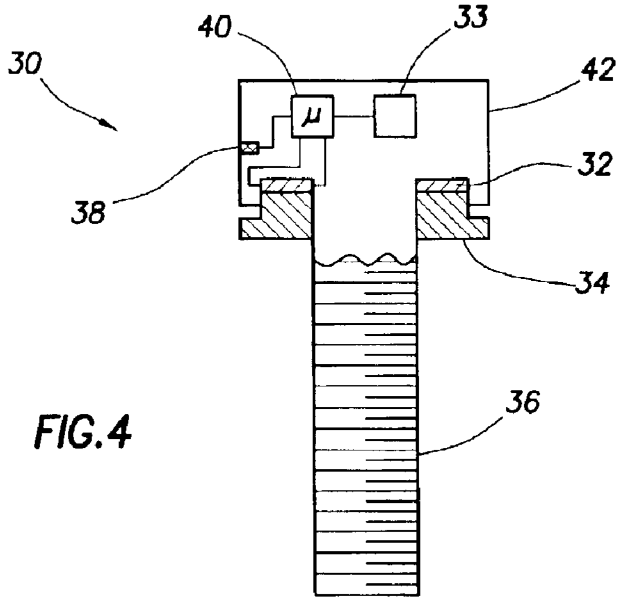
FIG. 4 is a cross-section in elevation of the bolt of the present invention.

FIG. 4 is a cross-section in elevation of the bolt 30 of the present invention. The internal components of the bolt 30 comprise a piezoelectric compound 32, a processor 40, and a memory 33. The processor 40 is electrically coupled to two opposite sides of the piezoelectric compound 32. The processor 40 can measure the electric potential across the piezoelectric compound 32 either from top to bottom or from inside to outside, depending on the nature and properties of the specific piezoelectric compound 32. The processor 40 is also electrically coupled to the electrical connection 38 so that the processor 40 can communicate with external devices. The processor 40 is also electrically coupled to the memory 33. The memory 33 is a non-volatile memory that stores data comprising at least the torque applied to the bolt 30. In the preferred embodiment, the memory 33 stores information pertaining to the bolt and the torque applied to the bolt 30.

Figure 5:
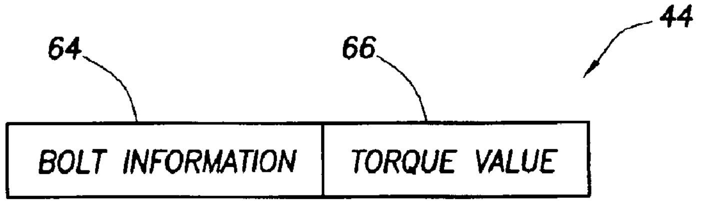
FIG. 5 is an illustration of the data packet of the present invention.

When the threaded shank 36 is inserted into a threaded connection (not shown) and the bolt 30 is rotated, the lower member 34 will eventually contact a surface (not shown). Continued rotation of the bolt 30 will continue to lower the upper member 42 while the lower member 34 either rotates without lowering or remains still. In either case, the upper member 42 will compress the piezoelectric compound 32 against the lower member 34. The upper member 42 and the lower member 34 may be configured so that there is room for the piezoelectric compound 32 to physically distort between upper member 42 and lower member 34. The compression of the piezoelectric compound 32 produces an electrical potential within the crystalline structure of the piezoelectric compound 32, which is measured by the processor 40. The processor 40 uses the electrical potential to calculate the torque applied to the bolt 30 and stores this value in the memory 33. Alternatively, the bolt 30 can communicate with the value of the electric potential to an external device that calculates the torque value 66. The memory 33 can also store information about the bolt 30. Examples of bolt information 64 that memory 33 can store are the bolt serial number, the size and shape of the bolt head, the size and pitch of the threaded shank 36, the location of the bolt 30 on the assembled structure, and a detailed list of the parts that the bolt 30 connects (i.e. the bolt 30 connects piece X to piece Y). Persons skilled in the art will be aware of other types of bolt information 64 that can be stored in memory 33. The value of the torque value 66 and the bolt information 64 are stored in a data packet 44 in the memory 33. FIG. 5 is depiction of the data packet 44 comprising the bolt information 64 and the torque value 66. The data packet 44 may then be transmitted to an external device, such as a wrench, sensor, or receiver, via electrical connection 38. Bolt 30 may receive power from an external device or the electrical potential of the piezoelectric compound 32 may be sufficient to enable processor 40 to transmit the data packet 44 to an external device without the need for a power source.

Figures 6, 9:
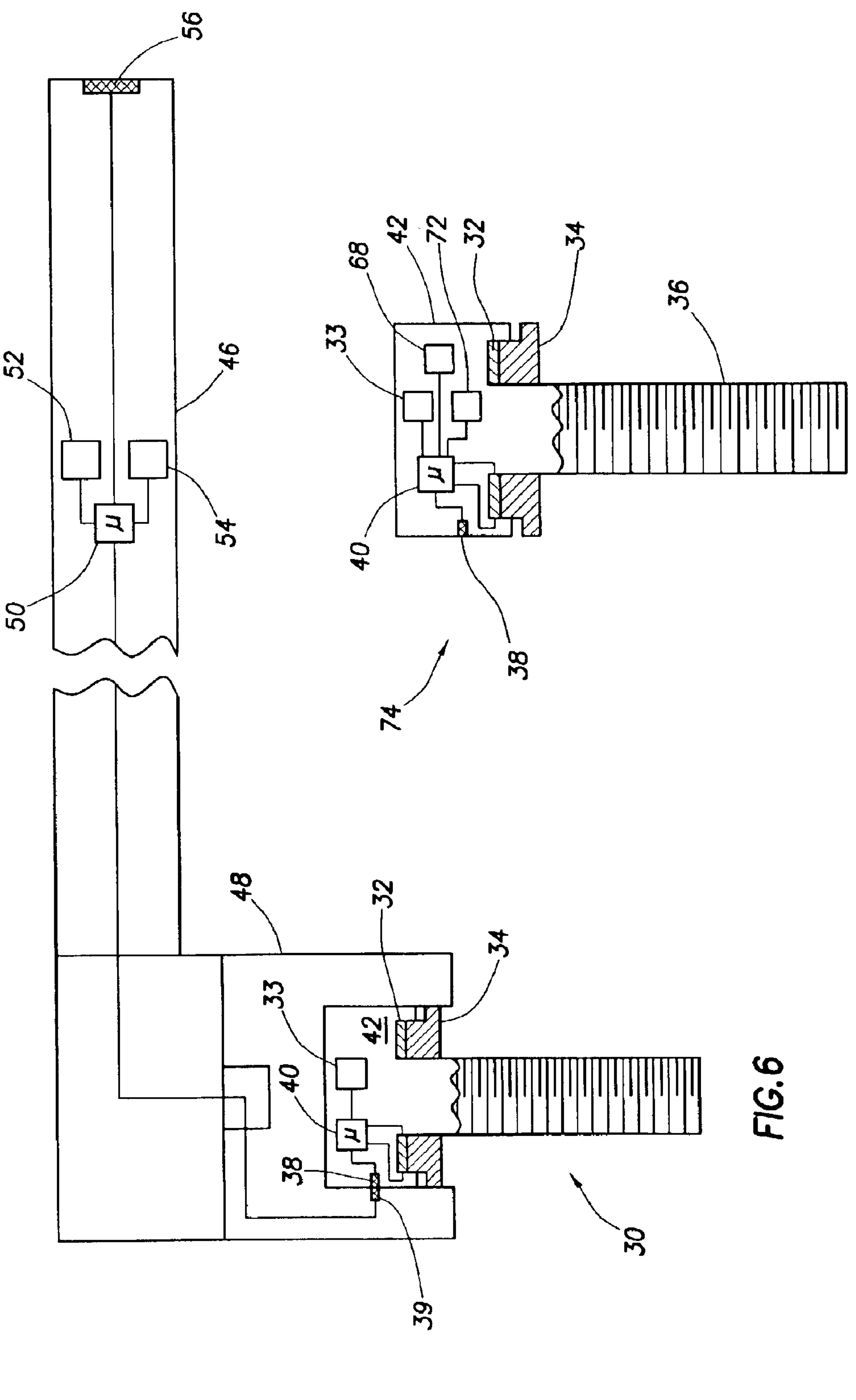
FIG. 6 is a cross-section in elevation of the bolt and wrench of the present invention.
FIG. 9 is a cross-section in elevation of an alternative embodiment of the bolt of the present invention.

FIG. 6 is a cross-section in elevation of the bolt 30 and the wrench 46 of the present invention. The wrench 46 is connected to a socket 48, which has a cavity shaped to accept the head of the bolt 30. The cavity walls of the socket 48 have an electrical connection 39 that electrically couples with electrical connection 38 on bolt 30 whenever the socket 48 is placed onto the bolt 30. In the preferred embodiment, the socket cavity is hexagonally shaped and has electrical connections 39 on two adjacent walls. In this configuration, when the socket 48 receives a bolt 30 configured with electrical connections 38 on three non-adjacent sides, one of the electrical connections 39 on the socket 48 will electrically couple with one of the electrical connects 38 on the bolt 30 regardless of the orientation of the connection (i.e. any one of the six ways a hexagonal socket cavity can fit onto a hexagonal bolt head) between the socket 48 and the bolt 30.

The wrench 46 comprises a processor 50, a memory 52, an optional power source 54, and an electrical connection 56. The processor 50 in the wrench 46 communicates with the processor 40 in the bolt 30 whenever the socket 48 is placed on the bolt 30. The processor 40 in the bolt 30 transmits the data packet 44 to the processor 50 in the wrench 46 whenever the two processors communicate. The processor 50 in the wrench 46 stores the data packet 44 in the memory 52. If necessary, the power source 54 can be utilized to provide power to the internal components of the wrench 46 (at least the processor 50 and the memory 52) and the internal components in the bolt 30 (at least the processor 40 and the memory 33).

Figure 7:
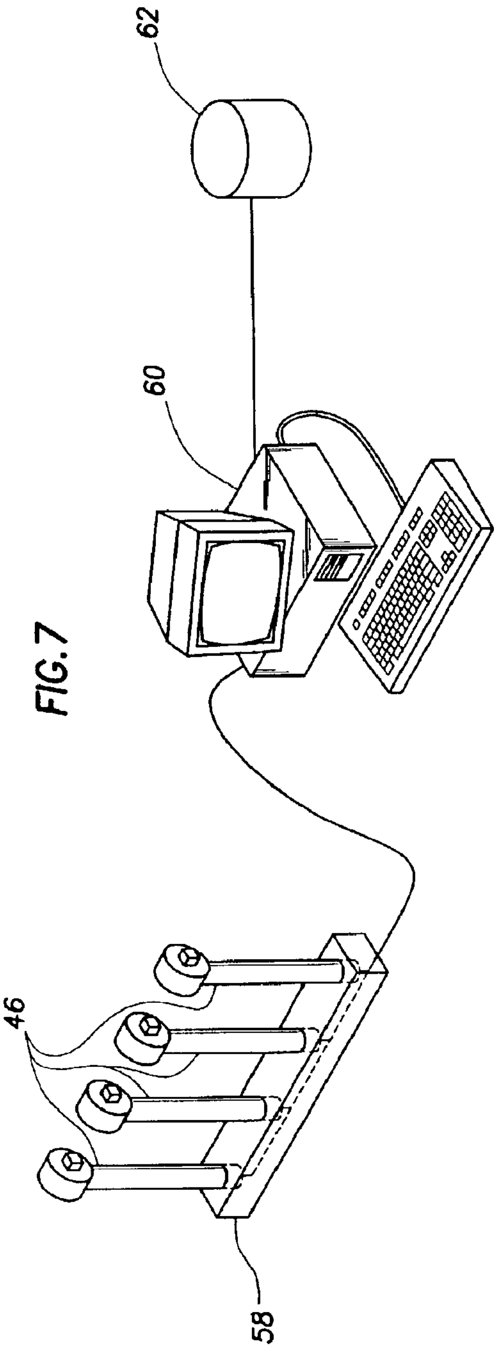
FIG. 7 is a perspective view of the present invention.

After the wrench 46 has received the data packet 44 from the bolt 30, the wrench 46 can be stored in a housing 58. FIG. 7 is a perspective view of a plurality of wrenches 46 stored in a housing 58. The housing 58 recharges the power sources 54 in the wrenches 46. The housing 58 also contains electrical connections (not shown) that mate up to the electrical connections 56 at the end of the wrenches 46. The electrical connections in the housing 58 are electrically coupled to a computer 60 containing a database 62. The processor 50 in the wrench 46 transmits the data packet 44 to the computer 60, which stores the data packet 44 in the database 62. The database 62 can store a multiplicity of data packets 44 such that the computer 60 can access the record of the data packets 44 and generate a report regarding the torque value 66 applied every bolt 30 (identified by the bolt information 64) in an assembled product.

Figure 8:
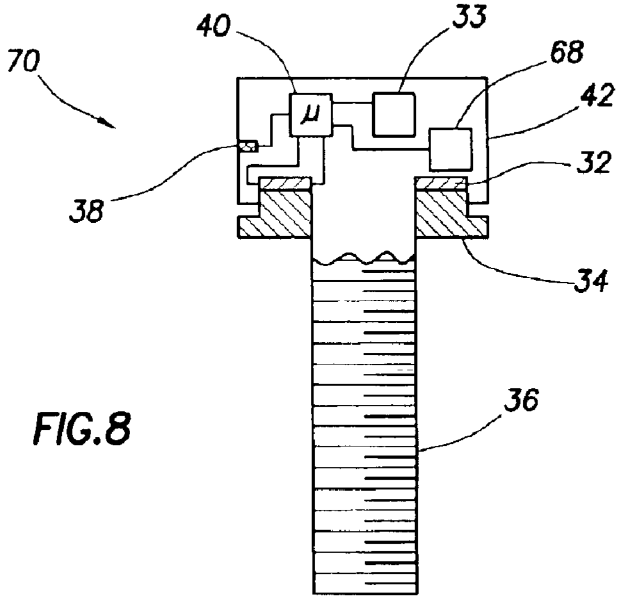
FIG. 8 is a cross-section in elevation of an alternative embodiment of the bolt of the present invention.

In some applications, it may be desirable for the bolt 30 to transmit the data packet 44 directly to the computer 60, bypassing the transmission step to the wrench 46. In this instance, a bolt 70 with a Radio Frequency (RF) transmitter/receiver 68 can be utilized, as seen in FIG. 8. FIG. 8 is a cross-section of the bolt 70 similar to the bolt 30, but further comprising the RF transmitter/receiver 68. Transmitter/receiver 68 can transmit and/or receive communications to an external device. When the socket 48 in FIG. 6 is placed onto the bolt 70 in FIG. 8, the power source 54 inside the wrench 46 provides power to the internal circuitry of the bolt 70 so that the processor 40 may transmit the data packet 44 to an external receiver (not shown). In this manner, the data packet 44 is transmitted to the computer 60 and the database 62 without the delay inherent in the process described in conjunction with FIGS. 4 through 7.

Alternatively, the electrical potential of the piezoelectric compound 32 may be sufficient to enable processor 40 to transmit the data packet 44 to an external device without the need for the power source 54. Further in the alternative, a signal may be transmitted from an external device to the bolt 70 requesting an update on the torque value 66 of the bolt 70. The signal from the external device is received by the RF transmitter/receiver 68, informing the processor 40 to measure the electric potential of the piezoelectric compound 32, calculate the torque, and transmit the data packet 44 back to the external device. In this manner, the external device can communicate with the bolts 70 of an assembled product and determine which bolts 70 are not torqued to specification. The external receiver can then notify an operator to correct the torque of the specific bolt 70.

Even further in the alternative, the processor 40 can monitor the piezoelectric compound 32 and transmit the data packet 44 to the external device whenever the torque value 66 changes to a value outside of a specified value. In this manner, the bolts 70 notify the external device whenever their torque values 66 fall outside of the allowable torque value.

Figure 10:
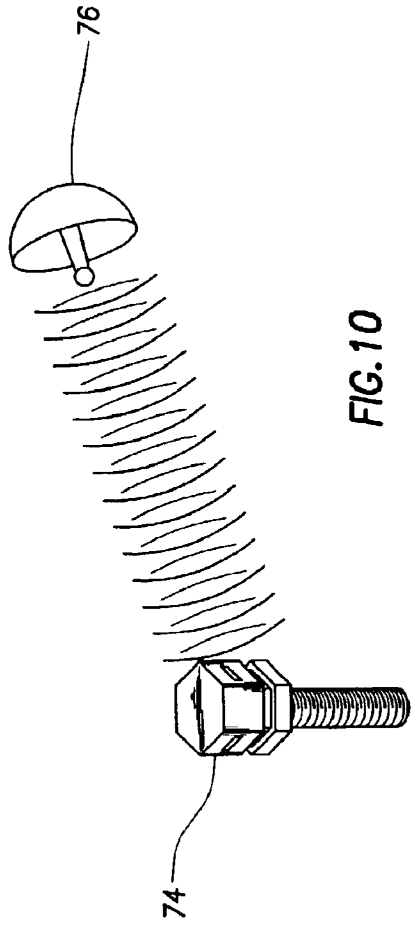
FIG. 10 is a perspective view of an alternative embodiment of the present invention.

In some applications, it may be desirable to power the bolt 70 without an external power source 54. In this case, an energizing circuitry 72 can be utilized to power the bolt 70. Energizing circuitry 72 is well known in the art as evidenced by products like the AT5100 TOLLTAG™ manufactured by the AMTECH® Corporation of Dallas, Tex. FIG. 9 is a cross-section in elevation of a bolt 74 utilizing energizing circuitry 72. The bolt 74 is similar to the bolt 70, but further comprises energizing circuitry 72. FIG. 10 is a perspective view of transmitter/receiver 76 energizing and communicating with the bolt 74. Although bolt 74 still contains an electrical connection 38 for backup power and/or communication, bolt 74 is useful because electrical connection 38 is not required to transmit data packet 44 from the bolt 74 to the database 62 via transmitter/receiver 76. In this manner, whenever the torque value 66 of the bolt 74 is desired, transmitter/receiver 76 can energize the bolt 74 and the bolt 74 will transmit the data packet 44 containing the updated torque value 66 and the bolt information 64 to the transmitter/receiver 76. By performing this operation on a multiplicity of bolts 74 on an entire aircraft, the computer 60 can determine whether the bolts 74 are torqued within specification with greater accuracy and in a fraction of the time required to check the bolts 74 by hand.

It should be understood that while the present invention is described in conjunction with bolts, the present invention is operable with other types of securement devices. For example, the present invention can be utilized with screws, rivets, nails, and the like. Furthermore, the present invention is not limited solely to securement devices. The present invention is useful in any application where a low-cost pressure or torque measuring apparatus is required.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A bolt comprising:

an upper member;

a piezoelectric compound located next to said upper member;

a lower member located next to said piezoelectric compound;

wherein said upper member and said lower member physically deform said piezoelectric compound upon application of a torque to the bolt;

wherein said piezoelectric compound produces an electrical potential indicative of the torque applied to said apparatus.

2. The apparatus of claim 1 further comprising: a processor; wherein said processor calculates the force applied to the apparatus based on said electric potential in said piezoelectric compound.

3. The apparatus of claim 2 further comprising: a memory; wherein said memory stores a data packet.

4. The apparatus of claim 2 further comprising: an RF transmitter/receiver; wherein said RF transmitter/receiver communicates with external devices.

5. The apparatus of claim 2 further comprising: energizing circuitry; wherein said energizing circuitry is a power source for said apparatus.

6. An apparatus for obtaining information from a bolt comprising:

a processor;

a memory electrically coupled to said processor;

wherein said processor communicates with the bolt containing a piezoelectric compound; and wherein said apparatus applies a force to said bolt.

7. The apparatus of claim 6 wherein said processor obtains a data packet from said bolt and stores said data packet in said memory.

8. The apparatus of claim 7 wherein said processor transmits said data packet to a computer.

9. The apparatus of claim 6 wherein said processor calculates said torque based on an electric potential in said piezoelectric compound.

10. The apparatus of claim 6 wherein said apparatus provides power to said bolt.

11. A system for determining the amount of torque applied to a bolt comprising:

a bolt comprising a piezoelectric compound;

a tool capable of applying a torque to said bolt; and wherein deformation of said piezoelectric compound produces an electric potential across said piezoelectric compound indicative of said torque.

12. The system of claim 11 wherein said tool is a wrench.

13. The system of claim 11 wherein a processor calculates a torque applied to said bolt based on said electric potential.

14. The system of claim 13 wherein said processor is located within said bolt.

15. The system of claim 13 wherein said processor is located within said tool.

16. The system of claim 13 wherein said processor is located within a computer.

17. The system of claim 11 wherein said bolt further comprises a memory; wherein said memory stores a data packet.

18. The system of claim 11 wherein said bolt further comprises: a RF transmitter/receiver; wherein said RF transmitter/receiver communicates a data packet to external devices.

19. The system of claim 11 wherein said bolt further comprises: energizing circuitry; wherein said energizing circuitry is a power source for said bolt.

20. A method of transmitting a signal indicative of a torque comprising:

exerting the torque on a bolt;

deforming a piezoelectric compound contained within said bolt;

measuring the electric potential across said piezoelectric compound;

calculating a value of said torque based on said electric potential; and communicating said torque value to a computer.

21. The method of claim 20 wherein further comprising communicating said torque value to a tool.

22. The method of claim 20 further comprising storing a data packet in a memory.

23. The method of claim 20 wherein said calculation is performed by a processor located within said bolt.

24. The method of claim 20 wherein said calculation is performed by a processor located within a tool.

25. The method of claim 20 wherein said calculation is performed by a processor located within said computer.

26. The method of claim 20 wherein said comprises a RF transmitter/receiver and said RF transmitter/receiver communicates with external devices.

* * * * *

UNITED STATES PATENT AND TRADEMARK OFFICE

CERTIFICATE OF CORRECTION

PATENT NO. : 6,925,395 B2
APPLICATION NO. : 10/270747
DATED : August 2, 2005
INVENTOR(S) : Steven P. Kadner It is certified that error appears in the above-identified patent and that said Letters Patent is hereby corrected as shown below:

Column 6, line 22, correct “wherein said apparatus applies a [force] to said bolt.” to read “wherein said apparatus applies a --torque-- to said bolt.”

Column 8, line 3, Claim 26, after “The method of claim 20 wherein said”, insert --securement device-- to read “The method of claim 20 wherein said securement device comprises a RF transmitter/receiver and said RF transmitter/receiver communicates with external devices.”

Signed and Sealed this

Thirty-first Day of October, 2006

JON W. DUDAS
*Director of the United States Patent and Trademark Office*